United States Patent
Lin et al.

(10) Patent No.: US 8,369,114 B2
(45) Date of Patent: Feb. 5, 2013

(54) POWER SUPPLY WITH OUTPUT OVERCURRENT DETECTION AND ERROR LATCH PROTECTION

(75) Inventors: Li-Wei Lin, Zhonghe (TW); Kuo-Liang Huang, Zhonghe (TW); Chun-Tso Yi, Zhonghe (TW)

(73) Assignee: Top Victory Investments Ltd., Harbour (HK)

( * ) Notice: Subject to any disclaimer, the term of this patent is extended or adjusted under 35 U.S.C. 154(b) by 261 days.

(21) Appl. No.: 12/967,164

(22) Filed: Dec. 14, 2010

(65) Prior Publication Data

US 2011/0141776 A1 Jun. 16, 2011

(30) Foreign Application Priority Data

Dec. 14, 2009 (TW) ............................... 98223395 U
Jan. 18, 2010 (TW) ............................... 99200956 U (51) Int. Cl.
*H02H 7/125* (2006.01)
*H02H 9/02* (2006.01)

(52) U.S. Cl. ............................. 363/52; 361/93.7; 307/43

(58) Field of Classification Search .................... 363/50, 363/52, 84, 89, 125; 307/43, 44, 45, 75, 307/82; 361/87, 93.1, 93.7
See application file for complete search history.

(56) References Cited

U.S. PATENT DOCUMENTS

| | | | | |
|---|---|---|---|---|
| 5,089,926 A * | 2/1992 | Kugelman | ...................... | 361/87 |
| 5,181,155 A * | 1/1993 | Beg et al. | ...................... | 361/94 |
| 5,355,024 A * | 10/1994 | Elliott et al. | ...................... | 307/73 |
| 5,773,945 A * | 6/1998 | Kim et al. | ...................... | 318/434 |
| 6,800,961 B2 * | 10/2004 | Basso | ...................... | 307/43 |
| 8,289,037 B2 * | 10/2012 | Labib et al. | ...................... | 324/713 |

* cited by examiner

*Primary Examiner* — Gary L Laxton
(74) *Attorney, Agent, or Firm* — Alan Kamrath; Kamrath IP Lawfirm, P.A.

(57) ABSTRACT

A power supply employs an error detecting circuit to output an error signal when detecting an overvoltage or overcurrent occurred in one of output powers and employs a latch trigger circuit to cause the power supply to enter a latch mode when receiving the error signal. The power supply will keep the latch mode when entering the latch mode until the AC power VAC is removed. In addition, the power supply employs the error detecting circuit to provide the accurate safety threshold value by the constant current source with temperature compensation function and stable constant current output.

13 Claims, 6 Drawing Sheets

POWER SUPPLY WITH OUTPUT OVERCURRENT DETECTION AND ERROR LATCH PROTECTION

BACKGROUND OF THE INVENTION

1. Field of the Invention

The invention relates to a power supply with protection function. More particularly, the invention relates to a power supply with output overcurrent detection and error latch protection.

2. Description of the Related Art

A power supply usually has some protection function such as output overcurrent detection and error latch protection. Now a power supply with error latch protection is usually designed by employing a controller integrated circuit (IC) with error latch function. When an error such as overcurrent or over voltage occurred in the output power, the power supply not only provides some protection but also enters the latch mode so that the power supply will not reset repeatedly if is the error is not solved. However, the latch mode of the power supply can be easily released, for example, by pressing the power button of the remote controller, resulting that the error of the power supply is easily ignored by the user.

SUMMARY OF THE INVENTION

Accordingly, a power supply is provided for avoiding the latch mode from being easily released while the power supply enters the latch mode.

According to an aspect of the invention, a power supply includes an alternating current (AC) to direct current (DC) converter, a main power converter, a standby power converter, a power switch circuit, an error detecting circuit and a latch trigger circuit. The AC to DC converter converts an AC power into a DC power while the AC power is supplied to the power supply. The main power converter coupled to the AC to DC converter converts the DC power into a main power when being enabled and stops outputting the main power when being disabled. The standby power converter coupled to the AC to DC converter converts the DC power into a standby power while the AC power is supplied to the power supply and stops outputting the standby power while the AC power is removed. The power switch circuit coupled to the main power converter receives a power switch signal and turns on or off the main power converter according to the power switch signal. The error detecting circuit coupled to the main power converter outputs an error signal when detecting an overvoltage or overcurrent occurred in the main power. The latch trigger circuit coupled to the standby power converter, the error detecting circuit and the power switch circuit controls the power switch circuit to turn off the main power converter and forces the standby power to stay at low level when receiving the error signal, and is inactivated when not receiving the error signal.

In one embodiment, the error detecting circuit detects whether or not an overcurrent flows through a power output line of the main power. The power output line has an input terminal and an output terminal. The error detecting circuit includes a detecting resistor, a setting resistor, a constant current source and a voltage comparator. The detecting resistor has a first terminal coupled to the input terminal of the power output line; and, a second terminal coupled to the output terminal of the power output line. The setting resistor has a first terminal coupled to the input terminal of the power output line; and, a second terminal. The constant current source coupled to the second terminal of the setting resistor sinks a constant current from the second terminal of the setting resistor. The voltage comparator coupled to the second terminal of the detecting resistor and the second terminal of the setting resistor outputs the error signal representing the overcurrent flowing through the power output line when a voltage at the second terminal of the detecting resistor is less than a voltage at the second terminal of the setting resistor.

In summary, while the AC power is supplied to the power supply of the invention, the power supply employs the error detecting circuit to output the error signal when detecting an overvoltage or overcurrent occurred in the main powers and/or the standby power, and employs the latch trigger circuit to control the power switch circuit to turn off the main power converter and force the standby power to stay at low level when receiving the error signal so that the power supply enters the latch mode. The power supply will keep the latch mode when entering the latch mode until the AC power VAC is removed. Therefore, the power supply does not employ the expansive controller IC with error latch protection and the latch mode are not easily released while the power supply enters the latch mode. In addition, the power supply employs the error detecting circuit to provide the accurate safety threshold value by the constant current source with temperature compensation function and stable constant current output.

BRIEF DESCRIPTION OF THE DRAWINGS

The foregoing and other features of the disclosure will be apparent and easily understood from a further reading of the specification, claims and by reference to the accompanying drawings in which:

DESCRIPTION OF THE PREFERRED EMBODIMENTS

Figure 1:
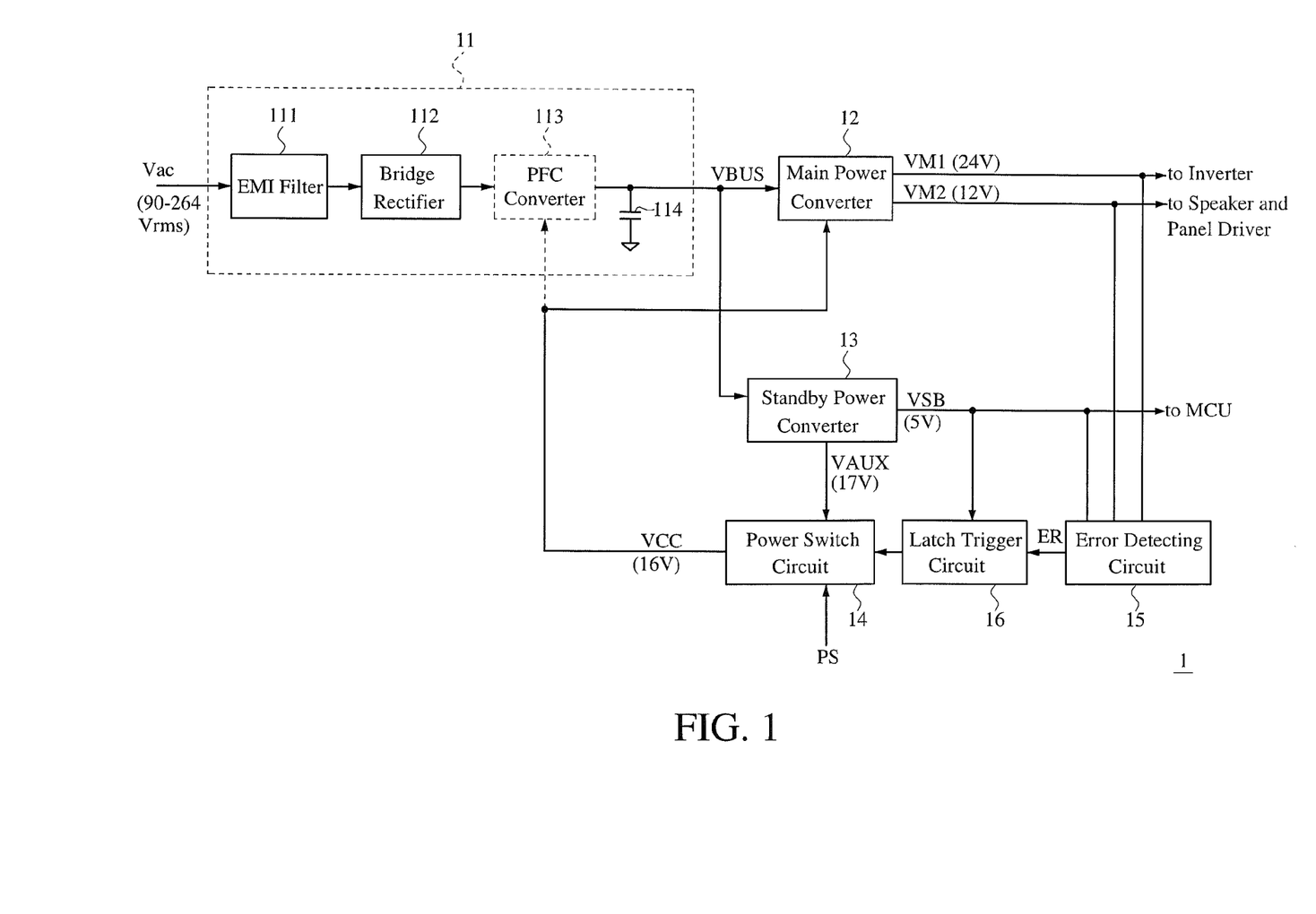
FIG. 1 is a block diagram illustrating an embodiment of a power supply according to the invention.

FIG. 1 is a block diagram illustrating an embodiment of a power supply according to the invention. Referring to FIG. 1, a power supply 1 includes an AC to DC converter 11, a main power converter 12, a standby power converter 13, a power switch circuit 14, an error detecting circuit 15 and a latch trigger circuit 16. While an AC power VAC is supplied to the power supply 1, the power supply 1 has two distinct operating modes: a normal mode and a standby mode. In the normal mode, the main power converter 12 and the standby power converter 13 perform power conversion to output main powers VM1, VM2 and a standby power VSB. In the standby mode, the main power converter 12 is disabled and only the standby power converter 13 performs power conversion to output the standby power VSB. In the embodiment, the power supply 1 is adapted to a display such as a liquid crystal display (LCD). The main power VM1 supplies power to an inverter to drive a backlight, the main power VM2 supplies power to a speaker and a panel driver, and the standby power VSB supplies power to a main board including a microcontroller unit (MCU). The MCU can monitor whether or not a user triggers an event such as pressing a power button of a remote controller so as to output a power switch signal PS to control the power supply 1 to switch between the normal mode and the standby mode. For instance, if the power switch signal PS is at high level, the power supply 1 enters the normal mode; and, if the power switch signal PS is at low level, the power supply 1 enters the standby mode.

The AC to DC converter 11 converts the AC power VAC into a DC power VBUS while the AC power VAC is supplied to the power supply 1. The AC to DC converter 11 includes an electromagnetic interference (EMI) filter 111, a bridge rectifier 112, an optional power factor correction (PFC) converter 113 and a bus capacitor 114. The EMI filter 111 attenuates conducted EMI between the power line of the AC power VAC and the power supply 1. The bridge rectifier 112 converts the AC power VAC into the DC power VBUS. Because the bridge rectifier 112 distorts the current drawn from the AC power VAC, if the power supply 1 has the power consumption above 75 W, the PFC converter 113 is required to be placed after the bridge rectifier 112 to meet the harmonic current specification. The bus capacitor 114 is employed for energy storage and filter to reduce the ripple voltage of the DC power VBUS.

The main power converter 12 is coupled to the AC to DC converter 11. The main power converter 12 converts the DC power VBUS into the main powers VM1 and VM2 when being enabled, and stops outputting the main powers VM1 and VM2 when being disabled. The standby power converter 13 is coupled to the AC to DC converter 11. The standby power converter 13 converts the DC power VBUS into the standby power VSB while the AC power VAC is supplied to the power supply 1, and stops outputting the standby power VSB while the AC power VAC is removed. Thus, whether or not the AC power VAC is supplied to the power supply 1 can be judged from whether or not the standby power VSB is outputted.

The power switch circuit 14 is coupled to the main power converter 12. The power switch circuit 14 receives the power switch signal PS and turns on or off the main power converter 12 according to the power switch signal PS. The error detecting circuit 15 is coupled to the main power converter 12 and/or the standby power converter 13. The error detecting circuit 15 outputs an error signal ER when detecting an overvoltage or overcurrent occurred in the main powers VM1, VM2 and/or the standby power VSB (i.e. one of the output powers VM1, VM2 and VSB). The latch trigger circuit 16 is coupled to the standby power converter 13, the error detecting circuit 15 and the power switch circuit 14. The latch trigger circuit 16 is activated to control the power switch circuit 14 to turn off the main power converter 12 and force the standby power VSB to stay at low level when receiving the error signal ER, and is inactivated when not receiving the error signal ER.

Before the AC power VAC is not removed, the standby power converter 13 keeps outputting the standby power VSB, and the latch trigger circuit 16 keeps waiting for the error signal ER. When the latch trigger circuit 16 receives the error signal ER, an overvoltage or overcurrent occurred in the main powers VM1, VM2 and/or the standby power VSB, the power supply 1 enters a latch mode. In the latch mode, the latch trigger circuit 16 is activated to control the power switch circuit 14 to turn off the main power converter 12 and force the standby power VSB to stay at low level so that the power supply 1 substantially stops outputting the main powers VM1, VM2 and the standby power VSB. The power supply 1 will keep the latch mode when entering the latch mode until the AC power VAC is removed. If the power supply 1 enters the latch mode and then the AC power VAC is removed, the latch trigger circuit 16 and the other components are powered down so as to release the latch mode. Therefore, the power supply 1 keeping the latch mode is released by removing the AC power VAC supplied to the power supply 1.

In addition, when the AC to DC converter 11 includes the PFC converter 113, the power switch circuit 14 is further coupled to the PFC converter 113 and turns on or off the PFC converter 113 according to the power switch signal PS. The latch trigger circuit 16 is activated to control the power switch circuit 14 to further turn off the PFC converter 113 when receiving the error signal ER.

Figure 2:
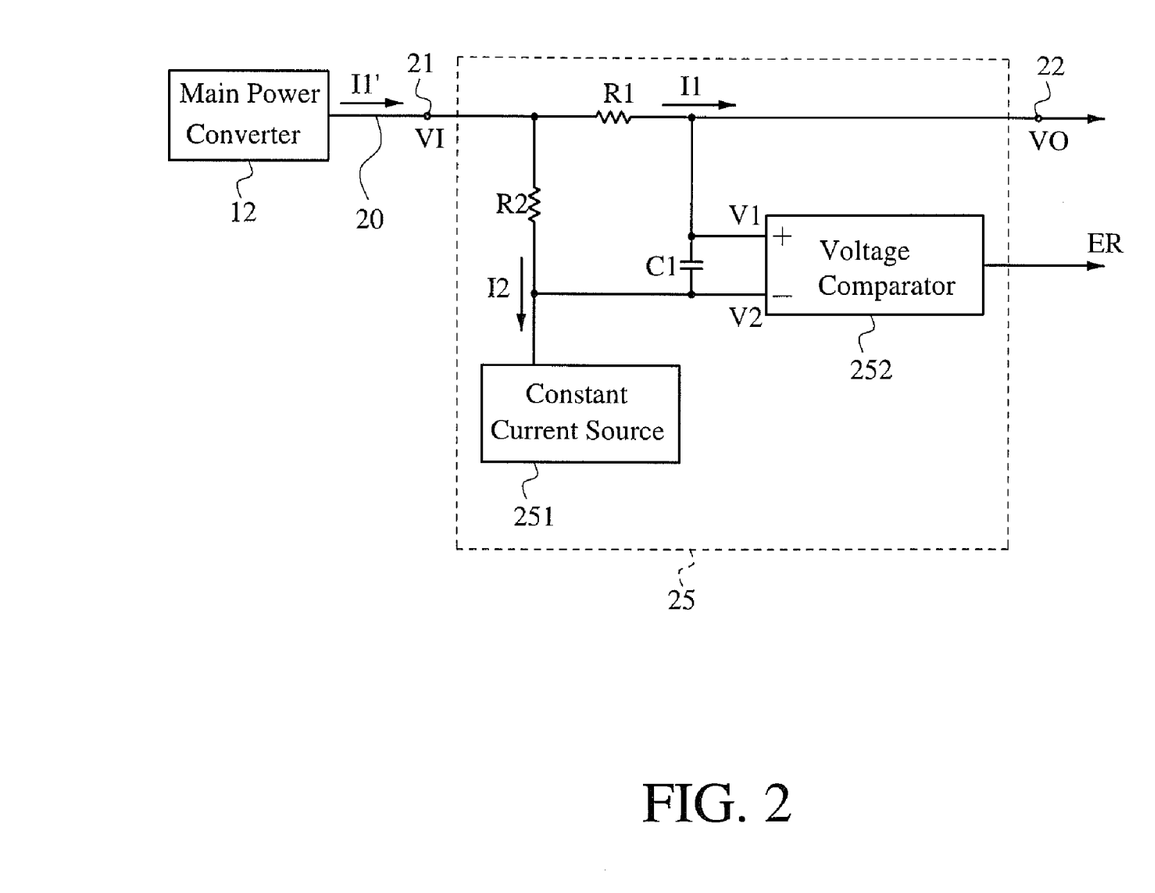
FIG. 2 is a schematic diagram illustrating an embodiment of the error detecting circuit shown in FIG. 1.

FIG. 2 is a schematic diagram illustrating an embodiment of the error detecting circuit shown in FIG. 1. Referring to FIG. 2, a power converter such as the main power converter 12 provides a power source such as the main power VM2 through a power output line 20. The power source provides a stable DC voltage V1 and a DC current I1' which varies according to the load. When the load varies, the DC current I1' may increase to cause the damage on the power converter and/or the load. A detecting resistor R1 is inserted in the power output line 20 to detect whether or not an overcurrent flows through the power output line 20. After the detecting resistor R1 has inserted, the power output line 20 has an input terminal 21 and an output terminal 22. The input terminal 21 receives the DC voltage V1 and the DC current I1' provided form the power converter, and the output terminal 22 provides a DC voltage V0 and a DC current I1 to the load. Due to the very low resistance of the detecting resistor R1, the DC voltage V0 is close to the DC voltage V1 and the DC current I1 is close to the DC current I1'.

The error detecting circuit 25 includes the detecting resistor R1, a setting resistor R2, a constant current source 251 and a voltage comparator 252. The detecting resistor R1 has a first terminal coupled to the input terminal 21 of the power output line 20; and, a second terminal coupled to the output terminal 22 of the power output line 20. The setting resistor R2 has a first terminal coupled to the input terminal 21 of the power output line 20; and, a second terminal. The constant current source 251 coupled to the second terminal of the setting resistor R2 for sinking a constant current I2 from the second terminal of the setting resistor R2. The voltage comparator 252 has a first input terminal (labeled "+") coupled to the second terminal of the detecting resistor R1; a second input terminal (labeled "−") coupled to the second terminal of the setting resistor R2; and, an output terminal. The voltage comparator 252 outputs the error signal ER representing the overcurrent flowing through the power output line 20 when a voltage V1 at the first input terminal (i.e. a voltage at the second terminal of the detecting resistor R1) is less than a voltage V2 at the second input terminal (i.e. a voltage at the second terminal of the setting resistor R2). In another embodiment, the error signal ER can be send to a controller such as MCU so that the controller performs some protections such as removing power or turning off the load.

The voltage comparator 252 is a high input impedance component and almost no current flows through the first and the input terminals of the voltage comparator 252. The current I1 almost flows through the detecting resistor R1, and the constant current I2 almost flows through the setting resistor R2. In addition, i1'=i1+i2, where i1', i1 and i2 are the current values of the current I1', I1 and I2, respectively. Accordingly, the voltage V1 is expressed as $V1=VI-i1\times r1$, and the voltage V2 is expressed as $V2=VI-i2\times r2$, where r1 and r2 are the resistances of the detecting resistor R1 and the setting resistor R2. When the voltage V1 is greater than the voltage V2, $i1<i2\times r2/r1$, the current value i1 of the current I1 does not exceed a safety threshold value and represents that there is no overcurrent flowing through the power output line 20. When the voltage V1 is less than the voltage V2, i1>i2×r2/r1, the current value i1 of the current I1 exceeds the safety threshold value and represents that there is an overcurrent flowing through the power output line 20, and accordingly the voltage comparator 252 outputs the error signal ER. Therefore, after the resistance r1 of the detecting resistor R1, the resistance r2 of the setting resistor R2 and the current value i2 of the constant current I2 are set, the safety threshold value for the current value i1 of is the current I1 is set to (i2×r2/r1). When the current value i1 of the current I1 is greater than the safety threshold value, the error detecting circuit 25 outputs the error signal ER.

In the embodiment, the error detecting circuit 25 further includes a capacitor C1. The capacitor C1 has a first terminal coupled to the second terminal of the detecting resistor R1; and, a second terminal coupled to the second terminal of the setting resistor R2. The capacitor C1 is employed to filter a noise between the first and the second input terminals of the voltage comparator 252 and provide buffer for signal transfer.

Figure 3:
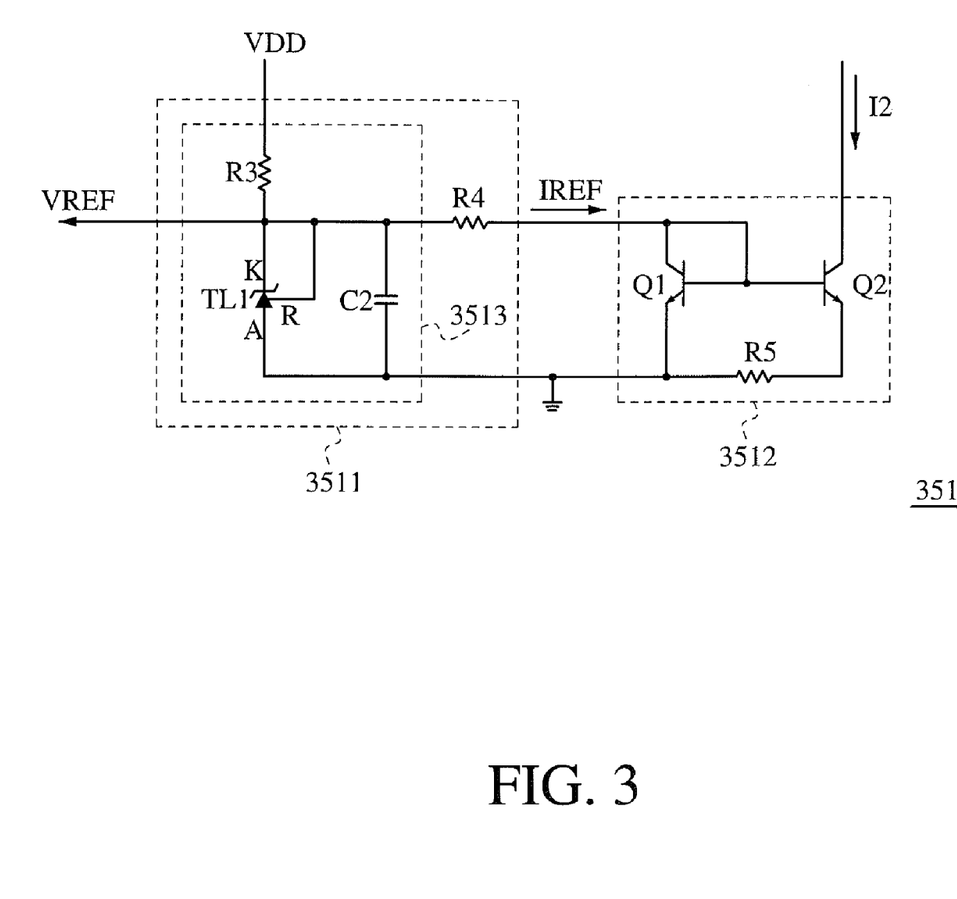
FIG. 3 is a schematic diagram illustrating an embodiment of the constant current source shown in FIG. 2.

FIG. 3 is a schematic diagram illustrating an embodiment of the constant current source shown in FIG. 2. Referring to FIG. 3, the constant current source 351 includes a reference current source 3511 and a current mirror 3512. The reference current source 3511 provides a reference current IREF. The current mirror 3512 coupled to the reference current source 3511 provides the constant current I2 according to the reference current IREF.

In the embodiment, the reference current source 3511 includes a reference voltage source 3513 and a transfer resistor R4. The reference voltage source to 3513 provides a reference voltage VREF, and the transfer resistor R4 converts the reference voltage VREF into the reference current IREF. The reference voltage source 3513 includes an input resistor R3 and a shunt regulator TL1. The input resistor R3 has a first terminal for receiving a DC voltage VDD; and, a second terminal. For example, the DC voltage VDD can be provided from one of the main powers VM1 and VM2. The shunt regulator TL1, such as TL431, has an anode terminal A coupled to ground; a cathode terminal K coupled to the second terminal of the input resistor R3; and, a reference terminal R coupled to the cathode terminal K for outputting the reference voltage VREF. The transfer resistor R4 has a first terminal coupled to the cathode terminal K for receiving the reference voltage VREF; and, a second terminal for outputting the reference current IREF to the current mirror 3512.

In the embodiment, the current mirror 3512 includes a first transistor Q1, a second transistor Q2 and a degeneration resistor R5. The first transistor Q1 and the second transistor Q2 are BJTs. The first transistor Q1 has a collector terminal coupled to the reference current source 3511 for receiving the reference current IREF; a base terminal coupled to the collector terminal of the first transistor Q1; and, an emitter terminal coupled to ground. The second transistor Q2 has a collector terminal for sinking the constant current I2; a base terminal coupled to the base terminal of the first transistor Q1; and, an emitter terminal. The degeneration resistor R5 has a first terminal coupled to the emitter terminal of the second transistor Q2; and, a second terminal coupled to ground.

The invention does not directly employ the reference current IREF as a current sunk by the constant current source 351. The invention employs the current mirror 3512 to generate the constant current I2 as a current sunk by the constant current source 351. This is because that the second transistor Q2 of the current mirror 3512 has a positive temperature coefficient, and it can provide temperature compensation for the setting resistor R2 with a negative temperature coefficient so as to reduce the influence on the safety threshold value. When the temperature increases, the setting resistor R2 is a negative temperature coefficient component so that the resistance r2 of the setting resistor R2 decreases and results that the voltage V2 becomes higher to cause the drift of the safety threshold value. Moreover, the second transistor Q2 is a positive temperature coefficient component so that the current value i2 of the current I2 increases and causes the voltage V2 to become normal. In addition, the invention employs the degeneration resistor R5 to share the voltage V2 dropped across the second transistor Q2 to avoid that the operating temperature of the second transistor Q2 becomes higher.

Figure 4:
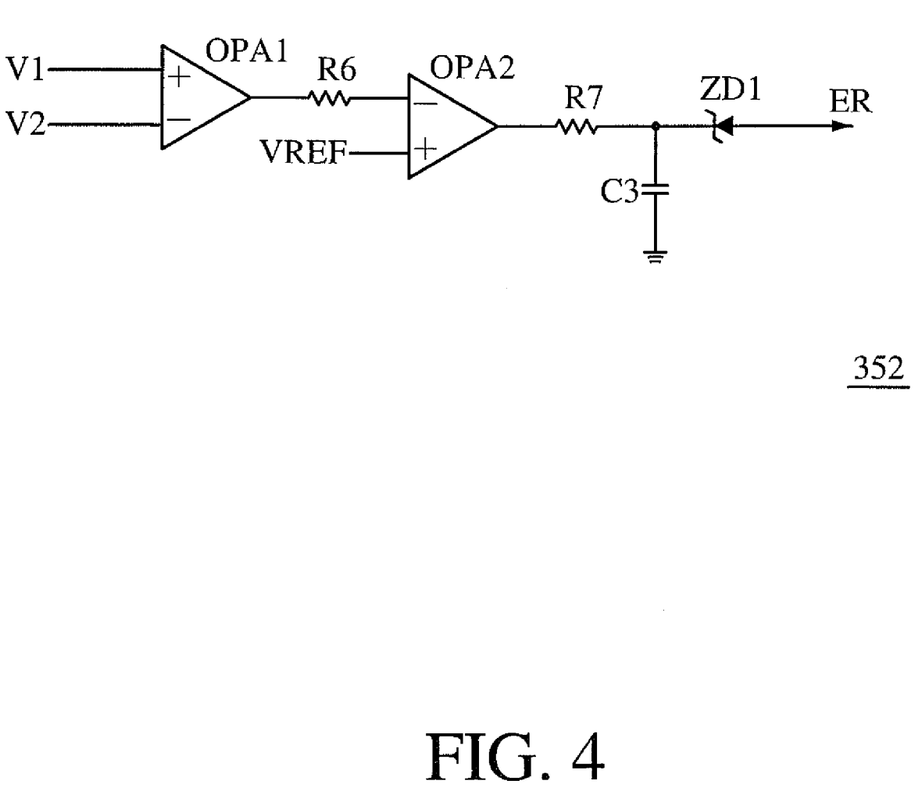
FIG. 4 is a schematic diagram illustrating an embodiment of the voltage comparator shown in FIG. 2.

FIG. 4 is a schematic diagram illustrating an embodiment of the voltage comparator shown in FIG. 2. Referring to FIG. 4, the voltage comparator 352 includes a first operational amplifier OPA1, a second operational amplifier OPA2 and a Zener diode ZD1. The first operational amplifier OPA1 has a non-inverting input terminal coupled to the second terminal of the detecting resistor R1; an inverting input terminal coupled to the second terminal of the setting resistor R2; and, an output terminal. The second operational amplifier OPA2 has a non-inverting input terminal coupled to the reference voltage VREF; an inverting input terminal coupled to the output terminal of the first operational amplifier OPA1 through a resistor R6; and, an output terminal. The Zener diode ZD1 has a cathode terminal coupled to the output terminal of the second operational amplifier OPA2; and, an anode terminal for outputting the error signal ER when the voltage V1 at the second terminal of the detecting resistor R1 is less than the voltage V2 at the second terminal of the setting resistor R2.

The first operational amplifier OPA1 is employed to compare the voltages V1 and V2. The second operational amplifier OPA2 is employed to invert the comparison result outputted from the first operational amplifier OPA1 and provide impedance matching. In the embodiment, the reference voltage VREF is provided from the reference voltage source 3513. The Zener diode ZD1 is employed to reduce the voltage level sent to the following component. The Zener diode ZD1 does not operate in the breakdown region unless the voltage outputted from the second operational amplifier OPA2 is sufficient and definite so that the Zener diode ZD1 provides another voltage level judgment criterion to increase noise suppression capability.

In the embodiment, the voltage comparator 352 further includes a resistor R7 and a capacitor C3. The resistor R7 has a first terminal coupled to the cathode terminal of the Zener diode ZD1; and, a second terminal coupled to the output terminal of the second operational amplifier OPA2. The capacitor C3 has a first terminal coupled to the first terminal of the resistor R7; and, a second terminal coupled to ground. The resistor R7 and the capacitor C3 form a RC filter to provide buffer for signal transfer through its RC time constant.

Figure 5:
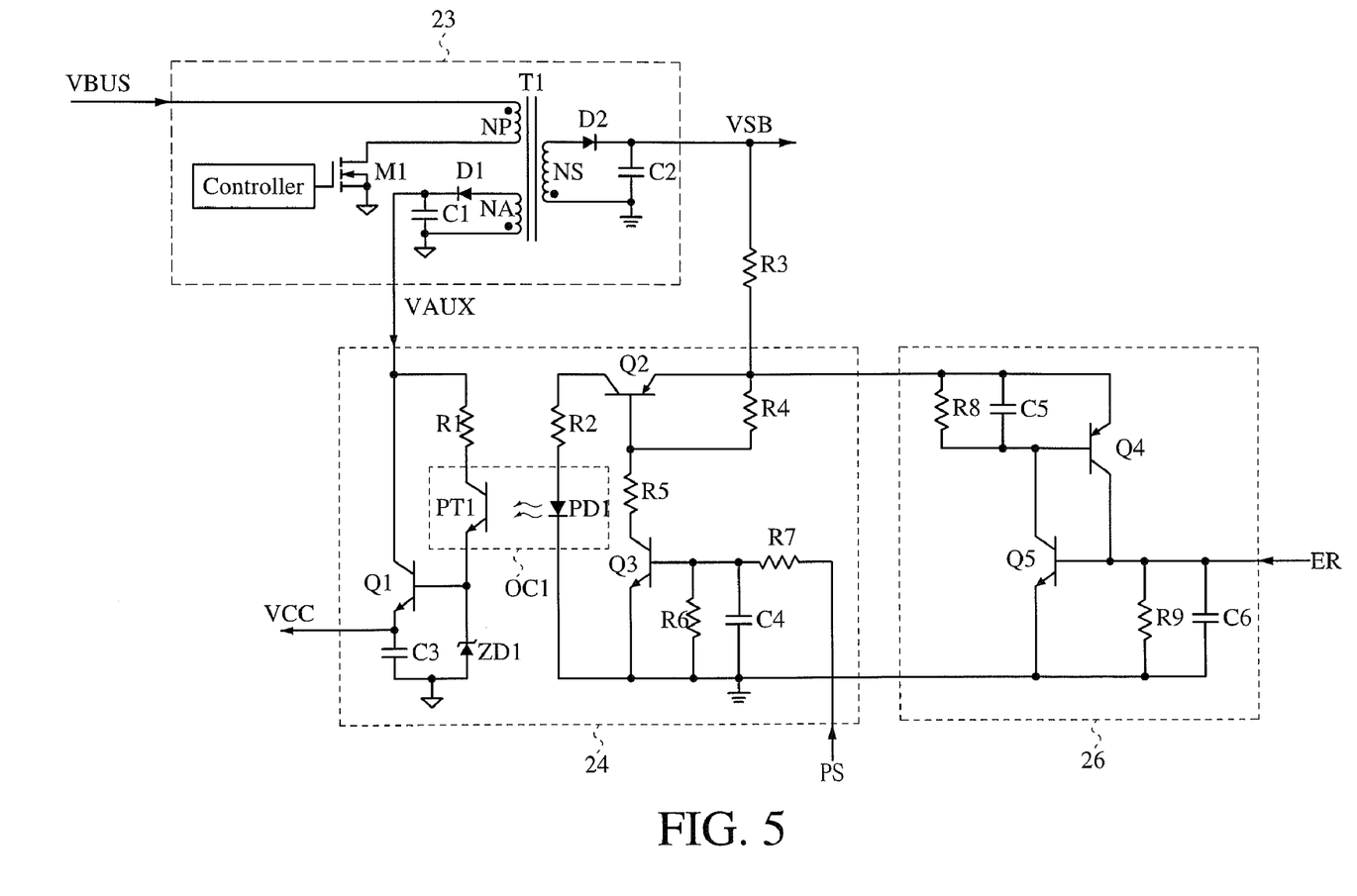
FIG. 5 is a schematic diagram illustrating an embodiment of the standby power converter, the power switch circuit and the latch trigger circuit shown in FIG. 1.

FIG. 5 is a schematic diagram illustrating an embodiment of the standby power converter, the power switch circuit and the latch trigger circuit shown in FIG. 1. Referring to FIG. 5, the standby power converter 23 employs a flyback topology including a transformer T1 (having a primary winding NP, a secondary winding NS and an auxiliary winding NA), a transistor M1, diodes D1-D2, capacitors C1-C2 and a controller. The auxiliary winding NA, the diode D1 and the capacitors C1 are employed to provide an auxiliary DC voltage VAUX.

The power switch circuit 24 includes a switch circuit and an isolation circuit. The switch circuit has a first terminal coupled to the standby power VSB, a second terminal and a control terminal coupled to the power switch signal PS. The switch circuit is turned on or off according to the power switch signal PS. It is known that if the switch circuit is turned on, its first and second terminals are conducted; and, if the switch circuit is turned off, its first and second terminals are not conducted. The isolation circuit has an input terminal coupled to the second terminal of the switch circuit and an output terminal. The isolation circuit has an input terminal coupled to the second terminal of the switch circuit and an output terminal. The isolation circuit outputs an internal power VCC from its output terminal to supply power to enable the main power converter 12 while the standby power VSB is not forced to stay at low level, and stops supplying power to the main power converter 12 while the standby power VSB is forced to stay at low level.

In the embodiment, the switch circuit includes transistors Q2-Q3, resistors R3-R7 and a capacitor C4, and the isolation circuit includes a photocoupler OC1, a transistor Q1, resistors R1-R2, a capacitor C3 and a Zener diode ZD1. When the power switch signal PS is at low level, the resistors R6 and R7 provide a low voltage to the base terminal of the transistor Q3 so that the transistor Q3 is cut off. The resistor R5 is open at its one terminal and no current flows through the resistor R4, resulting in no voltage across the base and the emitter terminals of the transistor Q2 so that the transistor Q2 is cut off. Accordingly, a light-emitting component PD1 of the photocoupler OC1 does not provide light in response to no current flowing through the light-emitting component PD1, and a light detector component PT1 of the photocoupler OC1 does not generate current in response to no light so that the transistor Q1 is cut off. Therefore, the auxiliary DC voltage VAUX cannot provide the internal voltage VCC through the transistor Q1 so that the main power converter 12 and the PFC converter 113 will be turned off because no power supplies to their controller.

When the power switch signal PS is at high level, the resistors R6 and R7 provide a high voltage to the base terminal of the transistor Q3 so that the transistor Q3 is conducted. The resistors R3-R5 provide a low voltage to the base terminal of the transistor Q2 so that the transistor Q2 is conducted. Accordingly, the light-emitting component PD1 provides light in response to a current flowing through the light-emitting component PD1, and the light detector component PT1 generates current in response to the light so that the transistor Q1 is conducted. Therefore, the auxiliary DC voltage VAUX can provide the internal voltage VCC through the transistor Q1 so that the main power converter 12 and the PFC converter 113 will be turned on because the power supplies to their controller. The Zener diode ZD1 is employed to limit a voltage at the base terminal of the transistor Q1 to protect the transistor Q1.

The latch trigger circuit 26 includes a P-type transistor Q4 and an N-type transistor Q5, both are bipolar junction transistors (BJTs). The P-type transistor Q4 has a collector terminal, a base terminal and an emitter terminal coupled to the first terminal of the switch circuit. The N-type transistor Q5 has a collector terminal coupled to the base terminal of the P-type transistor Q4; a base terminal coupled to the collector terminal of the P-type transistor Q4 and the error detecting circuit 15 for receiving the error signal ER; and, an emitter terminal coupled to ground.

When an overvoltage or overcurrent occurred in one of the output powers VM1, VM2 and VSB, the error detecting circuit 15 outputs the error signal ER; for instance, the error signal ER is at high level. After the latch trigger circuit 26 receives the error signal ER, the resistor R9 provides a high level voltage to the base terminal of the transistor Q5 so that the transistor Q5 is conducted. When the transistor Q5 is conducted, a current through the collector terminal of the transistor Q5 is equal to a current through the base terminal of the transistor Q4, so that the transistor Q4 is conducted and a current through the collector terminal of transistor Q4 provide current for the transistor Q5 to keep conducted. Therefore, at the moment that the latch trigger circuit 26 receives the error signal ER, the transistors Q4 and Q5 will be self-biased and conducted so that a voltage at the emitter terminal of the transistor Q2 is pulled down and then the transistor Q2 is cut off. Accordingly, the transistor Q1 is cut off through the photocoupler OC1 and the internal voltage VCC is not provided so that the main power converter 12 and the PFC converter 113 will be turned on because no power supplies to their controller. Now no matter that the power switch signal PS is at high or low level, the internal voltage VCC is not provided because the transistor Q1 is cut off; that is, the power switch signal PS is inactive.

After entering the latch mode, the latch mode will be released by causing a current through the transistor Q4 to be zero. Only way to cause a current through the transistor Q4 to be zero is to remove the AC power VAC so that the standby power VSB is not provided.

Figure 6:
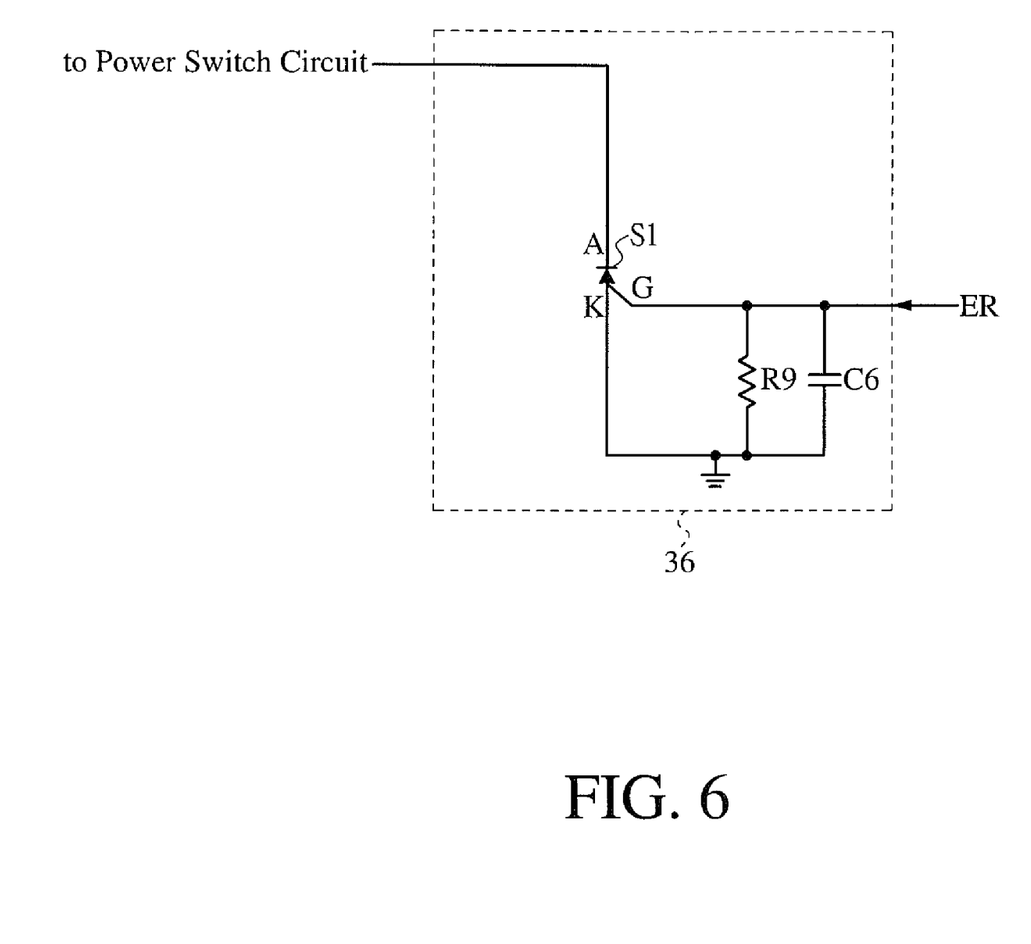
FIG. 6 is a schematic diagram illustrating another embodiment of the latch trigger circuit shown in FIG. 1.

FIG. 6 is a schematic diagram illustrating another embodiment of the latch trigger circuit shown in FIG. 1. Referring to FIG. 6, the latch trigger circuit 36 includes a silicon controlled rectifier (SCR) S1. The SCR S1 has an anode terminal A coupled to the first terminal of the switch circuit; a cathode terminal K coupled to ground; and, a gate terminal G coupled to the error detecting circuit 15 for receiving the error signal ER.

In summary, while the AC power is supplied to the power supply of the invention, the power supply employs the error detecting circuit to output the error signal when detecting an overvoltage or overcurrent occurred in the main powers and/or the standby power, and employs the latch trigger circuit to control the power switch circuit to turn off the main power converter and force the standby power to stay at low level when receiving the error signal so that the power supply enters the latch mode. The power supply will keep the latch mode when entering the latch mode until the AC power VAC is removed. Therefore, the power supply does not employ the expansive controller IC with error latch protection and the latch mode are not easily released while the power supply enters the latch mode. In addition, the power supply employs the error detecting circuit to provide the accurate safety threshold value by the constant current source with temperature compensation function and stable constant current output.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

We claim:
1. A power supply comprising:
an alternating current (AC) to direct current (DC) converter for converting an AC power into a DC power while the AC power is supplied to the power supply;
a main power converter coupled to the AC to DC converter for converting the DC power into a main power when being enabled and stopping outputting the main power when being disabled;
a standby power converter coupled to the AC to DC converter for converting the DC power into a standby power while the AC power is supplied to the power supply and stopping outputting the standby power while the AC power is removed;

a power switch circuit coupled to the main power converter for receiving a power switch signal and turning on or off the main power converter according to the power switch signal;

an error detecting circuit coupled to the main power converter for outputting an error signal when detecting an overvoltage or overcurrent occurred in the main power; and a latch trigger circuit coupled to the standby power converter, the error detecting circuit and the power switch circuit for controlling the power switch circuit to turn off the main power converter and forcing the standby power to stay at low level when receiving the error signal, and being inactivated when not receiving the error signal.

2. The power supply according to claim 1, wherein the AC to DC converter comprises a power factor correction (PFC) converter, the power switch circuit is further coupled to the PFC converter and turns on or off the PFC converter according to the power switch signal, and the latch trigger circuit is activated to control the power switch circuit to further turn off the PFC converter when receiving the error signal.

3. The power supply according to claim 1, wherein the power switch circuit comprises:

a switch circuit having a first terminal coupled to the standby power; a second terminal; and, a control terminal coupled to the power switch signal, the switch circuit being turned on or off according to the power switch signal; and an isolation circuit having an input terminal coupled to the second terminal of the switch circuit and an output terminal for supplying power to enable the main power converter while the standby power is not forced to stay at low level and stopping supplying power to the main power converter while the standby power is forced to stay at low level.

4. The power supply according to claim 3, wherein the latch trigger circuit comprises:

a P-type transistor having a collector terminal, a base terminal and an emitter terminal coupled to the first terminal of the switch circuit; and an N-type transistor having a collector terminal coupled to the base terminal of the P-type transistor; a base terminal coupled to the collector terminal of the P-type transistor and the error detecting circuit for receiving the error signal; and, an emitter terminal coupled to ground, wherein, the P-type transistor and the N-type transistor are bipolar junction transistors.

5. The power supply according to claim 3, wherein the latch trigger circuit comprises a silicon controlled rectifier (SCR) having an anode terminal coupled to the first terminal of the switch circuit; a cathode terminal coupled to ground; and, a gate terminal coupled to the error detecting circuit for receiving the error signal.

6. The power supply according to claim 1, wherein the error detecting circuit detects whether or not an overcurrent flows through a power output line of the main power, the power output line having an input terminal and an output terminal, the error detecting circuit comprising:

a detecting resistor having a first terminal coupled to the input terminal of the power output line; and, a second terminal coupled to the output terminal of the power output line;

a setting resistor having a first terminal coupled to the input terminal of the power output line; and, a second terminal;

a constant current source coupled to the second terminal of the setting resistor for sinking a constant current from the second terminal of the setting resistor; and a voltage comparator coupled to the second terminal of the detecting resistor and the second terminal of the setting resistor for outputting the error signal representing the overcurrent flowing through the power output line when a voltage at the second terminal of the detecting resistor is less than a voltage at the second terminal of the setting resistor.

7. The power supply according to claim 6, wherein the error detecting circuit further comprises a capacitor having a first terminal coupled to the second terminal of the detecting resistor; and, a second terminal coupled to the second terminal of the setting resistor.

8. The power supply according to claim 6, wherein the constant current source comprises:

a reference current source for providing a reference current; and a current mirror coupled to the reference current source for providing the constant current according to the reference current.

9. The power supply according to claim 8, wherein the reference current source comprises:

a reference voltage source for providing a reference voltage, comprising:

an input resistor having a first terminal for receiving to a DC voltage; and, a second terminal; and a shunt regulator having an anode terminal coupled to ground; a cathode terminal coupled to the second terminal of the input resistor; and, a reference terminal coupled to the cathode terminal for outputting the reference voltage; and a transfer resistor having a first terminal coupled to the cathode terminal for receiving the reference voltage; and, a second terminal for outputting the reference current to the current mirror.

10. The power supply according to claim 8, wherein the current mirror comprises:

a first transistor having a collector terminal coupled to the reference current source for receiving the reference current; a base terminal coupled to the collector terminal of the first transistor; and, an emitter terminal coupled to ground;

a second transistor having a collector terminal for sinking the constant current; a base terminal coupled to the base terminal of the first transistor; and, an emitter terminal; and a degeneration resistor having a first terminal coupled to the emitter terminal of the second transistor; and, a second terminal coupled to ground, wherein, the first transistor and the second transistor are bipolar junction transistors.

11. The power supply according to claim 6, wherein the voltage comparator comprises:

a first operational amplifier having a non-inverting input terminal coupled to the second terminal of the detecting resistor; an inverting input terminal coupled to the second terminal of the setting resistor; and, an output terminal;

a second operational amplifier having a non-inverting input terminal coupled to a reference voltage; an inverting input terminal coupled to the output terminal of the first operational amplifier; and, an output terminal; and a Zener diode having a cathode terminal coupled to the output terminal of the second operational amplifier; and, an anode terminal for outputting the error signal when a voltage at the second terminal of the detecting resistor is less than a voltage at the second terminal of the setting resistor.

12. The power supply according to claim 11, wherein the voltage comparator further comprises:

a resistor having a first terminal coupled to the cathode terminal of the Zener diode; and, a second terminal coupled to the output terminal of the second operational amplifier; and a capacitor having a first terminal coupled to the first terminal of the resistor; and, a second terminal coupled to ground.

13. A power supply comprising a power output line and an error detecting circuit, the power supply providing a power source through the power output line, the error detecting circuit detecting whether or not an overcurrent flows through the power output line, the power output line having an input terminal and an output terminal, the error detecting circuit comprising:

a detecting resistor having a first terminal coupled to the input terminal of the power output line; and, a second terminal coupled to the output terminal of the power output line;

a setting resistor having a first terminal coupled to the input terminal of the power output line; and, a second terminal;

a constant current source coupled to the second terminal of the setting resistor for sinking a constant current from the second terminal of the setting resistor; and a voltage comparator coupled to the second terminal of the detecting resistor and the second terminal of the setting resistor for outputting an error signal representing the overcurrent flowing through the power output line when a voltage at the second terminal of the detecting resistor is less than a voltage at the second terminal of the setting resistor.

* * * * *